(12) United States Patent
Dorfman (10) Patent No.: US 6,986,287 B1
(45) Date of Patent: Jan. 17, 2006

(54) METHOD AND APPARATUS FOR STRAIN-STRESS SENSORS AND SMART SKIN FOR AIRCRAFT AND SPACE VEHICLES

(75) Inventor: Benjamin F. Dorfman, San Mateo, CA (US)

(73) Assignee: NanoDynamics Inc., Buffalo, NY (US)

( * ) Notice: Subject to any disclaimer, the term of this patent is extended or adjusted under 35 U.S.C. 154(b) by 0 days.

(21) Appl. No.: 10/669,435

(22) Filed: Sep. 25, 2003

Related U.S. Application Data (60) Provisional application No. 60/415,225, filed on Sep. 30, 2002.

(51) Int. Cl.
*G01B 7/16* (2006.01)

(52) U.S. Cl. ...................................................... 73/776

(58) Field of Classification Search ................. 73/760, 73/763, 767, 774, 775, 776
See application file for complete search history.

(56) References Cited

U.S. PATENT DOCUMENTS

| | | | |
|---|---|---|---|
| 4,871,962 A * | 10/1989 | Cheung | 324/699 |
| 4,922,182 A * | 5/1990 | Cox | 324/682 |
| 5,216,249 A * | 6/1993 | Jones et al. | 250/370.05 |
| 5,352,493 A * | 10/1994 | Dorfman et al. | 427/530 |
| 5,466,431 A * | 11/1995 | Dorfman et al. | 423/446 |
| 6,080,470 A * | 6/2000 | Dorfman | 428/216 |
| 6,215,630 B1 * | 4/2001 | Schultz et al. | 360/320 |
| 6,276,214 B1 | 8/2001 | Kimura et al. | |
| 6,315,956 B1 * | 11/2001 | Foulger | 422/98 |
| 6,452,564 B1 * | 9/2002 | Schoen et al. | 343/872 |
| 6,465,351 B1 * | 10/2002 | Jeong | 438/689 |
| 6,503,627 B1 * | 1/2003 | Niimi et al. | 428/409 |

* cited by examiner

*Primary Examiner*—Max Noori
(74) *Attorney, Agent, or Firm*—Brown, Raysman, Millstein, Felder & Steiner

(57) ABSTRACT

A new family of multifunctional smart coatings based on of stabilized diamond-like metal-carbon atomic scale composites and diamond-like atomic-scale composite (DL ASC) materials. Based on a unique combination of the coating fine structure, properties of the coating/substrate interface, and the mechanical and electrical properties of the coating, the disclosed smart coatings would integrate various high resolution sensors and interconnections, and the sensor would diagnose dangerous stress distribution in the coated subject with no distortion in real time, while these diamond-like coatings would simultaneously provide environmental protection of the coated surface and improve its aerodynamic quality.

21 Claims, 11 Drawing Sheets

METHOD AND APPARATUS FOR STRAIN-STRESS SENSORS AND SMART SKIN FOR AIRCRAFT AND SPACE VEHICLES

This application claims priority of U.S. Provisional Application Ser. No. 60/415,225 filed on Sep. 30, 2002 entitled: METHOD AND APPARATUS FOR STRAIN-STRESS SENSORS and SMART SKIN FOR AIRCRAFT AND SPACE VEHICLES.

BACKGROUND OF THE INVENTION

1. Field of the Invention

The present invention relates to sensors for critical stress diagnostics.

2. Description of the Related Art

Conductivity percolation, e.g., quasi-phase transition from a dielectric to conductive state, occurs in metal-dielectric composites in proximity of certain critical metal concentration. Electrical properties of near-percolation metal-dielectric composites are very sensitive to external pressure or internal stress, which makes them highly attractive for stress/strain sensors. Advantages of percolation-based sensors include a potentially broad range of detecting stress, strong change of conductivity under stress, and most importantly the possibility of direct detection of the dangerous tensile stress. A primary concern in applications for percolation-based sensors and in experimental research of metal-dielectric percolation, however, is producing a random metal distribution in the dielectric matrix. Additionally, Soft dielectrics, such as polymers, alkali-tungsten bronzes (like $Na_xWO_3$), or metal-ammonia solutions (like $Na_xNH_3$), cannot preserve their elastic properties over the important range of metal concentration. The last problem may be partly resolved in the mechanical mixtures of conducting and non conducting particles. However in mechanical mixtures as well as in common composites like Me—$SiO_2$, Me—$Al_2O_3$ (where Me is Au, Ni or Al) it is difficult to reach an atomic-scale metal distribution. Heavy alloyed semiconductors, like Al—Ge, Pb—Ge, AlGe, or amorphous semiconductors combine both these problems as well as a principle question about applicability of percolation concept to the semiconductor's conductivity.

During a four-decade history of experimental research in metal-dielectric percolation starting from the initial works, a primary concern has been producing material with the random metal distribution in dielectric matrix. Many different composite structures were under examination, including metal-insulator mixtures and soft dielectrics, such as polymers, or alkali-tungsten bronzes (like $Na_xWO_3$) or metal-ammonia solutions (like $Na_xNH_3$). However, no one experimental system is uniform and stable enough to be compared with the percolation theory.

Still, the art suggests some applications of percolation phenomena for strain sensors. U.S. Pat. No. 6,276,214 (Kimura, et al.) discusses a strain sensor functioned with conductive particle polymer composites. When conductive particles are dispersed beyond the percolation threshold, electric conductive paths are formed between the electrodes by chains of particles contacting with each other between the electrodes. Elongation of this composite results in an increase in the gap distances between conductive particles. This results in the increase in the electric resistance of the composites. It is found that strain sensors can be made by the use of this nature. Strains of iron frames or iron-concrete are known by the change of electric resistance of the sensors which are set on a surface of the place to be monitored. The conductive particle-polymer composites are molded or printed and then endowed with electrodes so as to form strain sensors. The sensors are installed on surfaces of structural parts such as iron frames. Lead wires are connected to the electrodes of the installed sensors. It is necessary to know the places where the sensors are installed. Main fields of the application of the present sensors are safety monitoring systems for buildings, bridges, tunnels, dams, etc. The sensors are also applicable for tanks of chemicals, aircraft, ships and mega-floats.

U.S. Pat. No. 6,315,956 (Foulger) discusses Electrochemical sensors made from conductive polymer composite materials. An electrochemical sensor which is tailored for sensitivity to specific chemical analytes by selecting proper constituents. The electrochemical sensor is comprised of an immiscible polymer blend of at least two polymers in which a conductive filler is dispersed in one of the polymers of the blend through a multiple percolation approach to compounding. When in the presence of a chemical analyte, which is in either a liquid or vapor phase, one phase of the dual immiscible polymer blend swells, effecting a decrease in the conductivity, or increase in resistivity, of the polymer blend. The electrochemical sensor is reversible in that when the chemical analyte evaporates or is removed, the polymer blend returns to its original conductivity. With the multiple percolation approach it is possible to make a single composite material identifiably sensitive to various chemical analytes by incorporating several major phase materials into the immiscible polymer blend, each having an affinity for swelling for a different analyte. Further, the multiple percolation approach allows sensors to be made at extremely low cost.

The U.S. Pat. No. 6,452,564 (Schoen, et al.) discusses RF surface wave attenuating dielectric coatings composed of conducting, high aspect ratio biologically-derived particles in a polymer matrix. A coating composite is provided for a platform surface of an antenna array for, when applied to the platform, affording isolation of radiating and receiving antennas of the array. The coating composite includes a plurality of conductively coated elongate tubes dispersed in an insulating polymer matrix at a volume loading density approaching that at which the composite begins to conduct electrically over macroscopic distances, i.e., close to the percolation threshold. The tubes are preferably comprised of microtubules comprised of biologically-derived, high-aspect rod-shaped particles of microscopic dimensions having an electroless plated metal coating thereon.

However, besides the above described limitation of structural resolution and uniformity, the polymer-based conventional composites suffer from various thermal, mechanical and chemical impacts, and their applications for sensors, especially in aero-space industry are very limited.

SUMMARY OF THE INVENTION

Recently, a new family of stabilized diamond-like carbon materials QUASAM (U.S. Pat. No. 6,080,470, Dorfman), and DLN, also known as Dylyn, (U.S. Pat. No. 5,352,493, Dorfman et al.; U.S. Pat. No. 5,466,431 Dorfman et al.), each of which are hereby incorporated herein by reference, have been developed. Both QUASAM and DLN are of a similar chemical composition $C_n[Si_{1-m}O_m]$, where typically n=3, m=0.45, and sp2: sp3 is in the range of 2:3 to 1:4 depending on growth conditions. While conventional DLC is an sp3: sp2 carbon stabilized by internal stress instead of external pressure, the fine chemical stabilization in QUA- SAM and DLN shifts the carbon-diamond equilibrium. Consequently, QUASAM and DLN are silica-stabilized virtually stress-independent carbon phases. DLN/Dylyn and QUASAM possess low stress, typically DLN possess stress 0.15 GPa, and QUASAM 0.05 GPa, i.e., within the limits of characterization errors in many samples, long-term thermal stability up to the temperature range 430 and 650° C. correspondingly, and short-term thermal stability up to 500° C. and 850° C. correspondingly. Both materials are atomically smooth, pore-free and uniform starting from the first atomic layers. Due to their chemical composition comprising of chemically complimentary elements O, C, and Si, both QUASAM and DLN possess nearly universal adhesion to any substrate.

Many of the examined Me-Carbon (Me—C) composites of atomic scale preserve their mechanical properties and prevent nano-crystals formation over the whole essential range of metal concentration. The metals with small atoms (Fe, Ni, Cr) form the ideal dielectric-metal percolating systems proving the three-dimensional (3-d) percolation theory, while the metals possessing large atomic diameter (W, Nb, Hf) display a giant shift of the percolation threshold. The whole range of the theoretically possible conductivity in the disordering atomic scale composite with diamond like matrix is nearly realized in the case of metals forming the stable metal-carbon composites of atomic scale up to about 45–50% of metallic component, such as Cr, Ni, Fe, Co, Mo, W, Nb, Ta, Ti, V, Mn, Re.

First confirmation of percolation theory in the silica-stabilized diamond like metal-carbon ASC, as well as founding of a giant shift of percolation threshold in the case of metal with relatively large atomic diameter is important as a principal verification of the ASC structure and stability.

The goal of this patent is to provide a new family of multifunctional smart coatings based on diamond-like atomic-scale composite (DL ASC) materials. The coatings will provide a real-time control of the surface stress distribution and potentially dangerous stress diagnostic for the most critical parts of flying vehicles.

Conductivity percolation, e.g., quasi-phase transition from dielectric to conductive state, occurs in metal-carbon diamond-like composites of atomic scale in proximity of certain critical metal concentration. The whole range of variable conductivity of metal-carbon composites of atomic scale (Me—C ASC) covers about 18 order of magnitude, from $\sim 10^{14}$–$10^{11}$ Ohm-cm to $10^{-}$ Ohm cm, of which about 6 to 8 orders in the range of $\sim 10^{10}$ –$10^{8}$ Ohm-cm to $\sim 10^{2}$ Ohm-cm occurs in a narrow proximity of a critical point. Metal concentration is defined by the film deposition and cannot be changed afterwards. However electrical properties of near-percolation Me—C ASC are very sensitive to the external pressure or internal stress. For instance, in Me—C ASC with metals possessing large atomic diameter, such as {Hf|C}, a giant shift of critical concentration is observed due to the internal stress. An advantage of the percolation-based sensors is a potentially broad range of detecting stress, strong change of conductivity under stress, and the possibility of direct detection of the dangerous tensile stress.

The present patent discloses a new family of multifunctional smart coatings based on stabilized diamond-like metal-carbon atomic scale composites (Me—C ASC) and diamond-like atomic-scale composite (DL ASC) materials. Based on a unique combination of the coating fine structure, the properties of the coating/substrate interface, and the mechanical and electrical properties of Me—C ASC over the entire important composition range, the disclosed smart coatings provide various high resolution sensors and interconnections that may be used to diagnose dangerous stress distribution in the coated subject with no distortion in real time, while simultaneously providing environmental protection of the coated surface and improving its aerodynamic quality. The disclosed sensors and smart skin may be also used in metallic, composite, and glass constructions in buildings, bridges, ground vehicles, pipe lines, and various equipment.

DETAILED DESCRIPTION OF THE PREFERRED EMBODIMENT(S)

This present invention provides a smart skin for structures, devices and vehicles, especially aircrafts, that may be used for controlling dangerous strain and stress, and for observing high-resolution stress distribution over the entire surface or any responsible parts of the technical objects. A high resolution smart skin, covering the body of the subject under control in accordance with the present invention, was not known in the prior art, and it was not possible to create such skin by the previous art technique.

The whole range of variable conductivity of metal-carbon composites of atomic scale (Me—C ASC) covers about 18 order of magnitude, from $\sim 10^{14}$–$10^{8}$ Ohm-cm to $\sim 10^{-4}$ Ohm-cm, of which about 6 to 8 orders in the range of $\sim 10^{10}$–to $10^{8}$ Ohm-cm to $\sim 10^{2}$ Ohm-cm, and occurs in a narrow proximity of the critical point. Metal concentration is defined by the film deposition and cannot be changed afterwards. However electrical properties of near-percolation Me—C ASC are very sensitive to the external pressure or internal stress.

The present invention is due to particular features unique to stabilized diamond-like carbon films (DL ASC) and stabilized diamond-like metal-carbon composites of atomic-scale (Me—C ASC). The term "of atomic scale" means materials uniformly disbursed down to the single atom level. That is, materials that are free of nanometer composites or phases of 10 to 30 nanometers or larger.

An atomic-scale conducting metallic network immersed in a diamond-like dielectric results with the utmost precise and reproducible percolation phenomena. This is the only known solid media exactly following the percolation theory, which allows for the precise design of percolation sensors, and percolation sensors with the highest sensitivity.

Me—C ASC and/or DL ASC also exhibit nearly atomic-scale uniformity over the whole range of conductivity over 18 orders of magnitude, including pure dielectric matrix, low metal concentration in stress/strain-sensitive composition range in proximity of conductivity percolation, and high metal concentration where material exhibits a regular metallic conductivity. This allows forming sensor patterns with any required resolution; forming regular conductors and insulator in one integrated smart coating structure; creating percolation sensors with very high sensitivity and strong reproducible change of conductivity under stress; creating in the same smart coating structure other important electronic elements, such as thin film capacitors allowing to control the potential along the percolation sensor line, and thus allowing control of the precise stress distribution; and very high adhesion that is equal or even exceed the tensile strength of many substrate materials, including metals and alloys commonly used in the aerospace industry.

These features of the coatings provide a strong correspondence between stress of the substrate and smart coatings without any distortion over the entire coated surface. They provide a combination of high hardness, fracture toughness, and relatively good flexibility sustaining a very strong strain of the coated substrate. They have strong resistance to severe environment conditions, such as abrasion and/or chemical impact. They also exhibit high thermal stability over a broad temperature range.

Figure 1A:
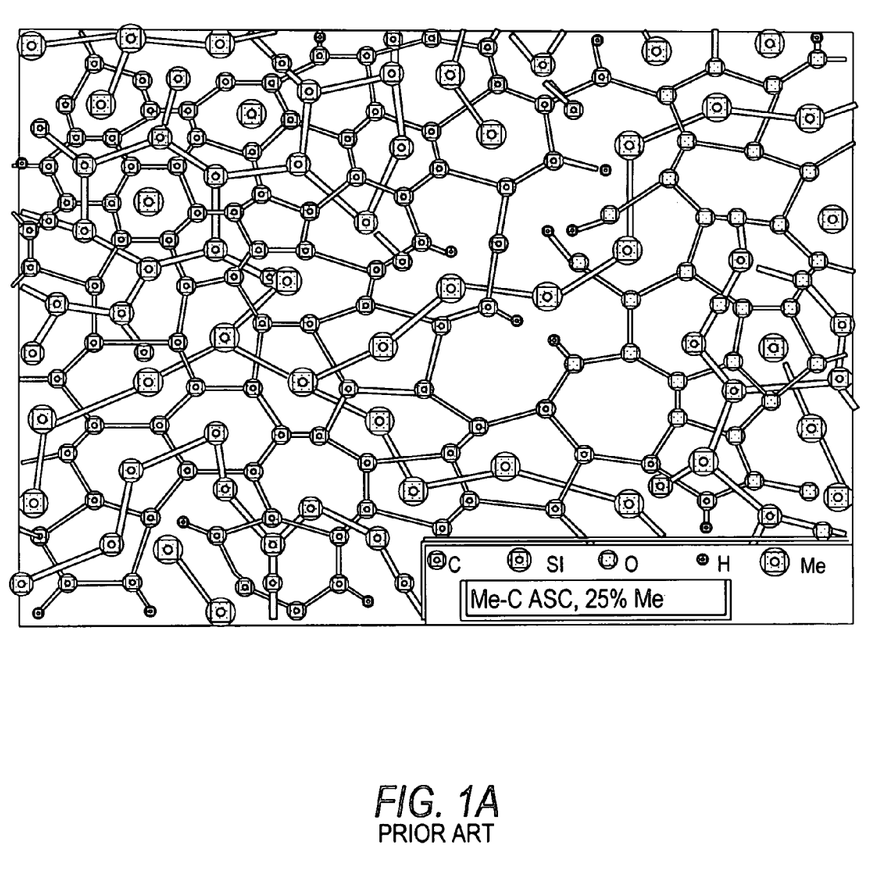
FIG. 1A (prior art) is a schematic model of Diamond-Like Metal-Carbon Atomic-Scale (Me—C ASC) composite in a close proximity of percolation threshold.

Referring now to FIG. 1A, which shows a schematic model of Diamond-Like Metal-Carbon Atomic Scale (Me—C ASC) composite in a close proximity of percolation threshold (25% Me). Some metallic atoms may be arranged in continuous chains and form a conductive network, while others may form randomly distributed separated fragment of network or may be scattered as individual atoms.

Figure 1B:
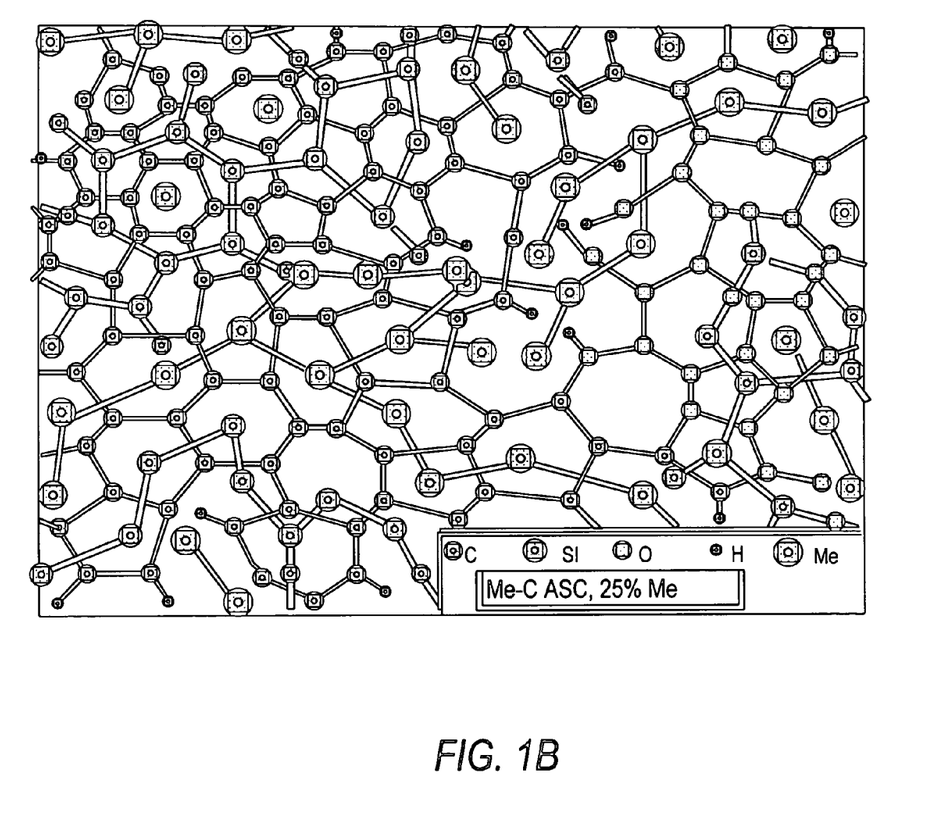
FIG. 1B is a schematic model of Diamond-Like Metal-Carbon Atomic-Scale (Me—C ASC) composite in a close proximity of percolation threshold under tensile stress.

FIG. 1B is a schematic model of Diamond-Like Metal-Carbon Atomic-Scale composite in a close proximity of percolation threshold under tensile stress. Some bridges in metallic network are broken, and chains of the metallic atoms separated.

Figure 1C:
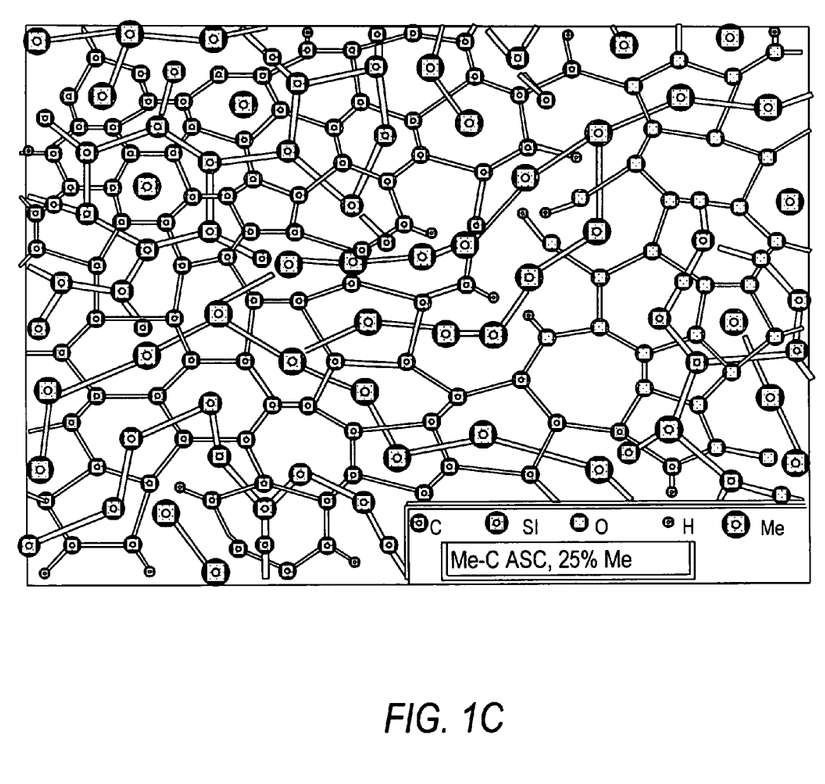
FIG. 1C is a schematic model of Diamond-Like Metal-Carbon Atomic-Scale (Me—C ASC) composite in a close proximity of percolation threshold under compressive stress.

FIG. 1C is a schematic model of Diamond-Like Metal-Carbon Atomic-Scale composite in a close proximity of percolation threshold under compressive stress. More metallic chains connected with conductive bridges, and a denser conductive network formed.

Figure 2A:
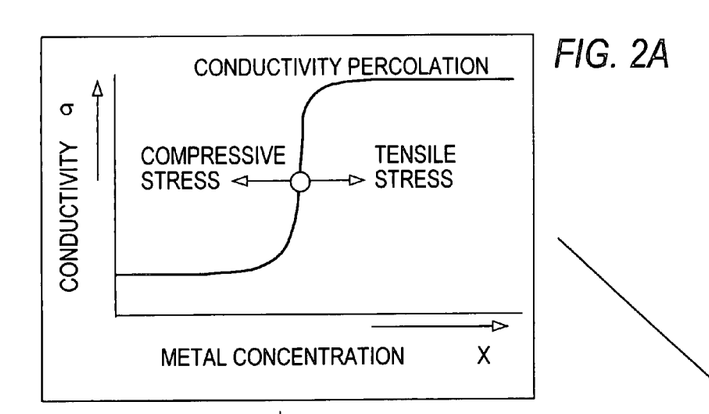
FIGS. 2A–C schematically shows shift of the percolation threshold in Me—C ASC under compressive and tensile stress.
Figure 2B:
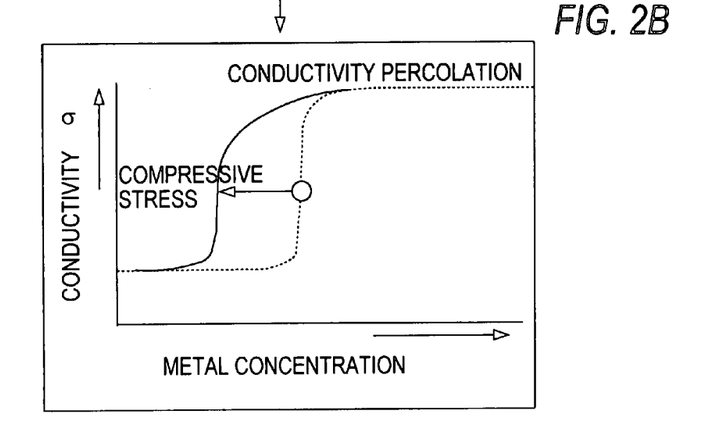
Figure 2C:
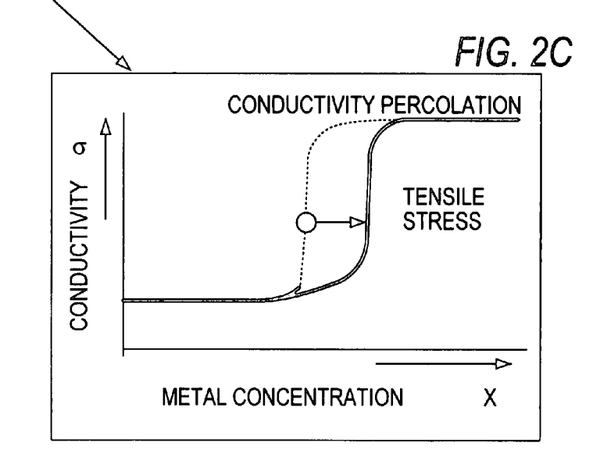

FIGS. 2A–C schematically shows shift of the percolation threshold in Me—C ASC under compressive (FIG. 2B) and tensile (FIG. 2C) stress. FIG. 2A shows the reference position with no applied stress.

Figure 3A:
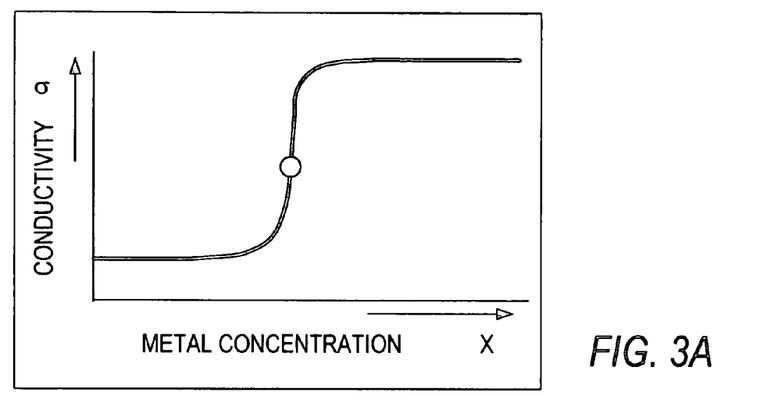
FIGS. 3A–F schematically shows the characteristics of three kinds of stress sensors.
Figure 3B:
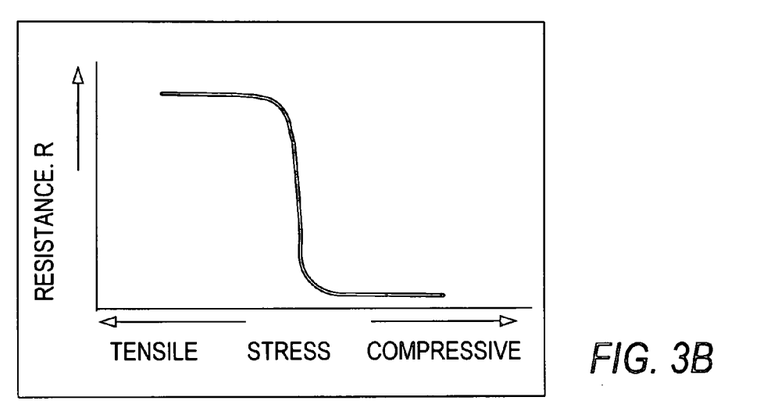
Figure 3C:
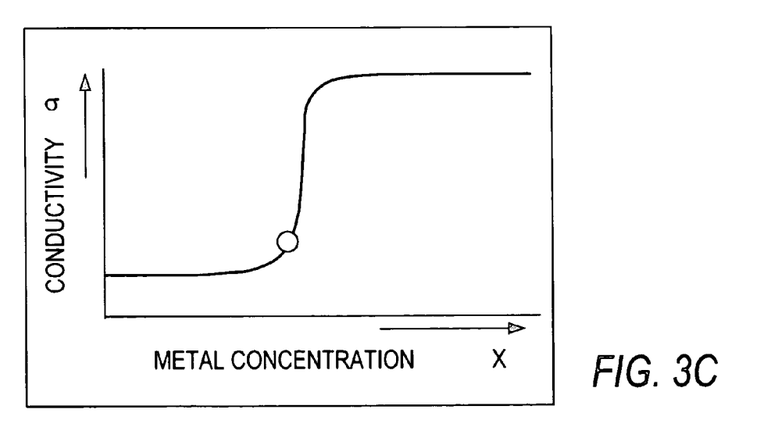
Figure 3D:
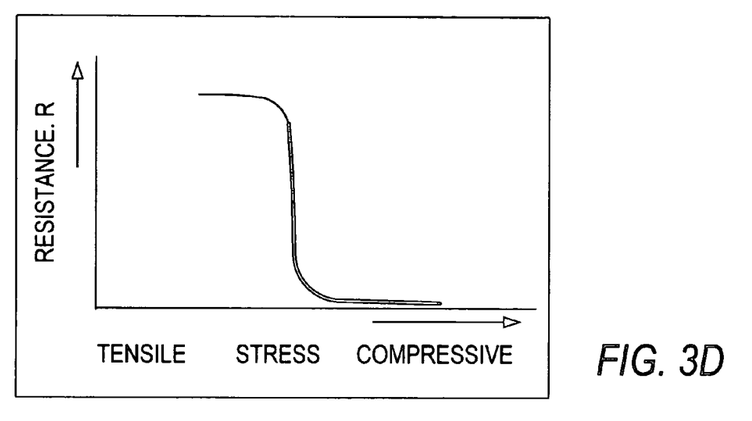
Figure 3E:
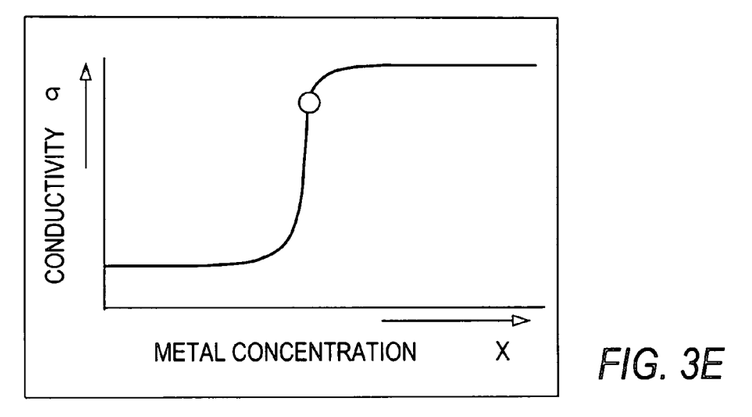
Figure 3F:
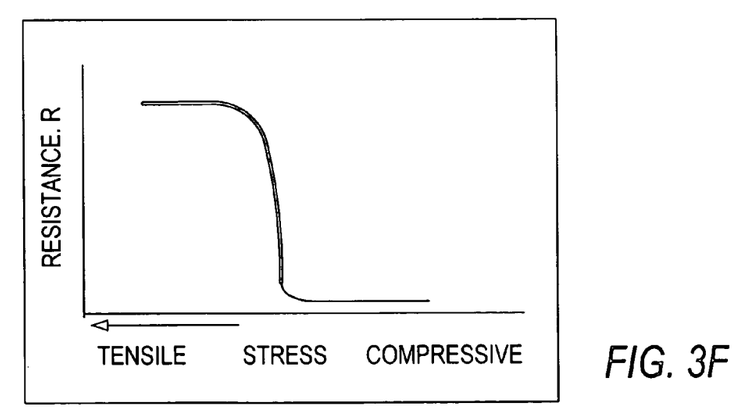

FIGS. 3A–F schematically shows three kinds of stress sensors. FIGS. 3A and 3B show a conductivity percolation sensor possessing metal concentration in the middle point of percolation transition. This sensor is equally sensitive to compressive and tensile stress. FIGS. 3B and 3C show a conductivity percolation sensor possessing metal concentration in pre-percolation vicinity of threshold. This sensor is more sensitive to compressive stress. FIGS. 3F and 3E show a conductivity percolation sensor possessing metal concentration in post-percolation vicinity of threshold. This sensor is more sensitive to tensile stress.

Figure 4:
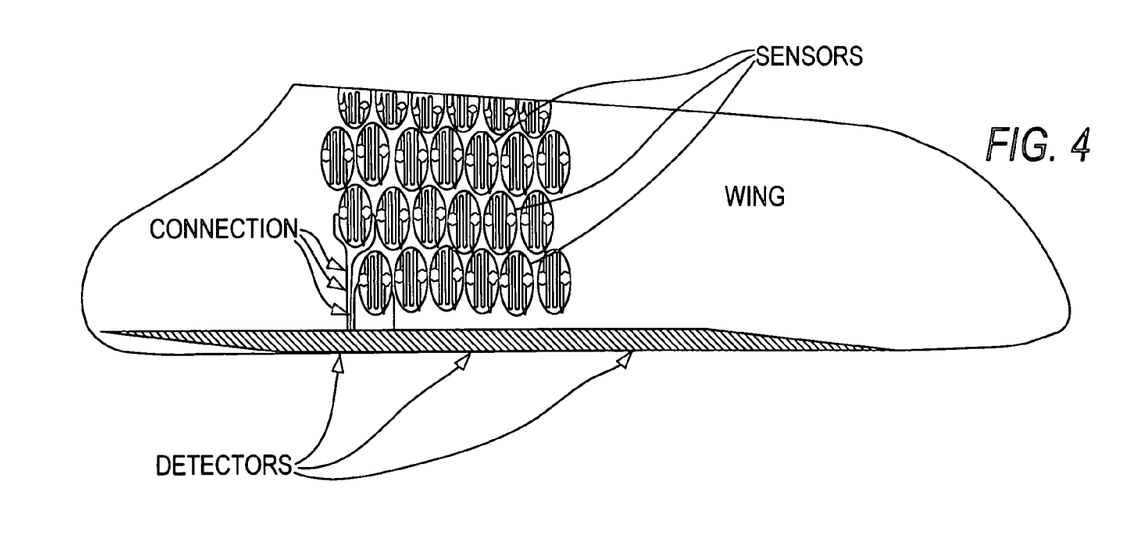
FIG. 4 shows one possible patterning of the Me—C ASC percolation sensors forming a smart skin upon the aircraft wing surface.

FIG. 4 shows one possible patterning of the Me—ASC percolation sensors forming a smart skin upon the aircraft wing surface. Me—C ASC films containing metal in the vicinity of the percolation threshold may be used as strain/stress sensors. The Me—C ASC may be deposited as a sensitive smart coatings upon the entire structure, or upon pre-defined areas of the structure, undergoing control and alarming for dangerous stress, as well as diagnostics for dangerous stress distribution. The appropriate pattern, such as linear, snake-like, or spiral, may be used as different types of sensitive conductors formed in the coatings. The linear pattern, for instance, may allow more precise diagnostics of the exact location of a dangerous stress area. A snake-like pattern may provide higher sensitivity to the stress oriented across the lines of the snake-like pattern. The spiral pattern may provide for high sensitivity independent of the stress distribution orientation.

Figure 5:
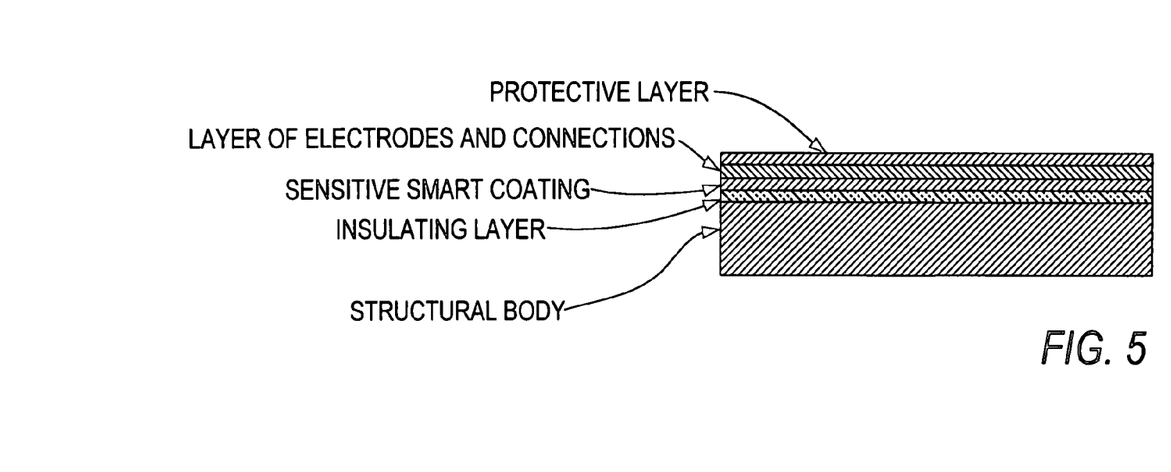
FIG. 5 shows a cross-section of smart skin upon the metallic wing.

FIG. 5 shows a cross-section of smart skin upon the metallic wing. The metal film (sensitive smart coating) may be a coating such as post-percolation Me—C ASC film. The insulating dielectric films, such as the insulating layer and protective layer, may be a coating such as pure ASC, deposited prior to or after deposition of the sensitive smart coatings. The change of resistance of individual conductors indicates stress and strain of corresponding area under Me—C ASC smart coating. The chemical stability and compatibility of these films aids in the reliability and adhesion of the films to the structural body surface. This is essential to provide the long life and environmental resistance required.

Two or three kinds of percolation sensors may be used in the same smart skin structure, such as pre-percolation composition sensors more sensitive to compressive stress (see FIGS. 3C and 3D), post-percolation composition sensors more sensitive to tensile stress (see FIGS. 3E and 3F), and middle-percolation composition sensors equally sensitive to compressive and tensile stress (see FIGS. 3A and 3B). Additionally, a post percolation sensor may be formed in the same smart skin to control the temperature and temperature distribution along the coated surface. Following are examples of fabrication of the coatings:

EXAMPLE 1

1. The electrically conducting subject to be coated with smart skin, such as the aircraft wing (as shown on FIGS. 4 and 5) is cleaned with a standard vacuum industry technique.

2. The subject to be coated with smart skin is located in a vacuum deposition chamber.

3. Air is pumped out of the deposition chamber up to about $1.0 \times 10^{-5}$ Torr.

4. The chamber is filled with argon up to a pressure of about $5 \times 10^{-5}$ Torr, and the surface to be coated clean in the argon low pressure discharge for about 10 minutes.

5. Unalloyed stabilized diamond-like carbon 3 micrometer thick dielectric layer is deposited upon the surface of the structure (FIGS. 4 and 5), such as the aircraft wing using a known technique (see U.S. Pat. Nos. 5,352,493, 5,718,976 and 6,080,470). This unalloyed stabilized diamond-like carbon dielectric layer possesses resistivity in an order of $10^{12}$ to $10^{13}$ Ohm-cm.

6. A Chromium-alloyed diamond-like Me—C 0.5 to 1.0 micrometer thick conducting stress sensing layer (as shown in cross-section on FIG. 5) is deposited upon the entire surface of the unalloyed stabilized diamond-like carbon dielectric layer. The chromium-alloyed diamond-like Me—C conducting layer possesses resistivity of about $10^4$ ohm-cm. The deposition of the unalloyed stabilized diamond-like carbon dielectric layer and the chromium-alloyed diamond-like Me—C conducting layer is carried out in the same vacuum chamber at the working pressure of about $10^{-5}$ Torr in one two-step continuous deposition process.

7. The chamber is filled with air up to atmospheric pressure opened, and the subject is removed from chamber.

8. The patterning of sensing pads or zones (as shown in FIG. 4) may be performed with a laser, such as a $CO_2$ laser. The laser cuts through the top sensing layer deposited in Step 6 without penetrating the insulating layer. The pads may be of any particular shape, such as isolated ovals, circles, squares, rectangles, or extended rectangular sections. Additionally, the pads may have a length to width ratio greater than, for example 4:1 (length:width), that run across entire structural sections (such as the width or length of a wing).

9. The subject is masked, either mechanically or otherwise, with, e.g., aluminum foil. The sensing pads and zones are covered by the mask, but contact areas on the sensing pads are left exposed.

10. The subject is located in a vacuum deposition chamber.

11. The air is pumped out of the deposition chamber up to about $1.0 \times 10^5$ Torr.

12. The chamber is filled with argon up to a pressure of about $5 \times 10^{-5}$ Torr, and the surface to be coated clean in the argon low pressure discharge for about 3 minutes.

13. A Chromium-alloyed diamond-like Me—C 0.5 to 1.0 micrometer thick conducting layer (as it shown in cross-section on FIG. 5) having a resistivity of about 104 Ohm-cm, is deposited upon the stress sensing pad areas of step 8. The conducting layers are placed in a local area at opposite ends of the sensing pad, so as to create a current flow across the entire area of the pad. A stress occurring in the underlying substrate surface beneath a pad would be detected by a change of impedance of the pad sensing layer.

14. The chamber is filled with air up to atmospheric pressure, opened, and the subject removed from the chamber.

15. The mechanical mask is removed.

16. The patterning of connecting lines (FIG. 4) may be realized with a laser, such as $CO_2$ laser, using any known technique.

17. The subject is located in a vacuum deposition chamber.

18. Air is pumped out of the deposition chamber up to about $1.0 \times 10^{-5}$ Torr.

19. The chamber is filled with argon up to pressure of about $5 \times 10^{-5}$ Torr, and the surface to be coated clean in the argon low pressure discharge for about 3 minutes.

Figure 6A:
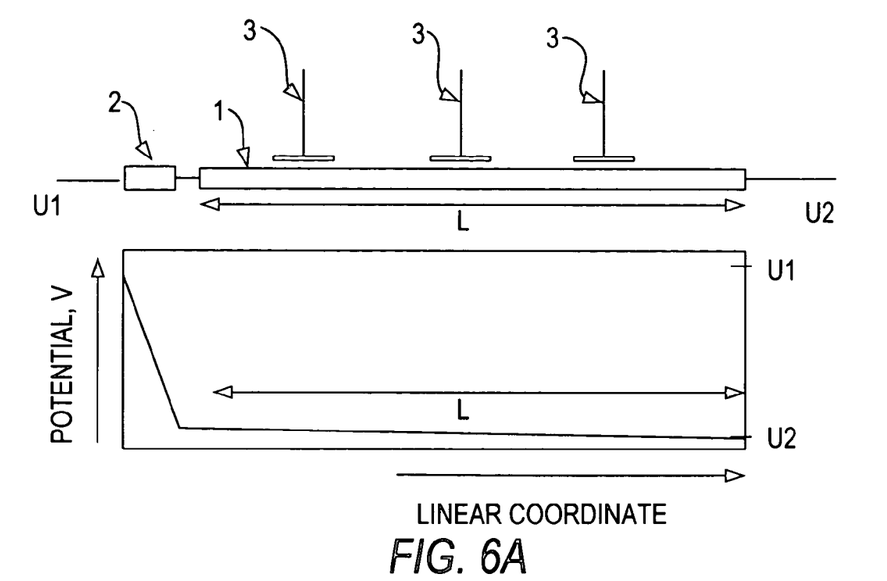
FIG. 6 shows a schematic of a Me—C ASC percolation sensor with capacitor bridges or direct contact sensors allowing diagnostic the exact location of dangerous stress.
Figure 6B:
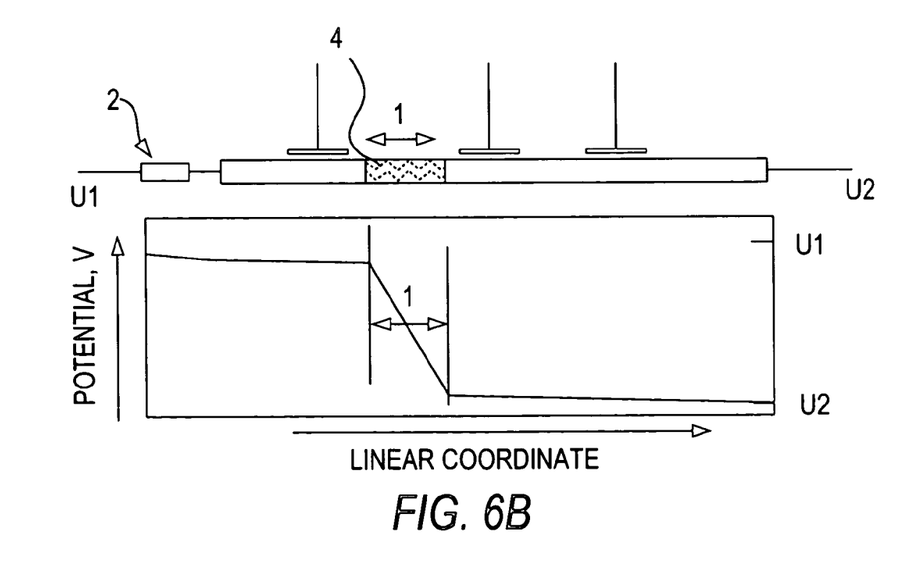

20. The operations 2, 3, 4, and 5 repeated, and a top dielectric layer deposited as a final protective layer of smart skin. The top dielectric layer is unalloyed stabilized diamond-like carbon 2 micrometer thick possesses resistivity in an order of $10^{12}$ to $10^{13}$ Ohm-cm. If more than two sensing lines are required for each sensor (as is shown in FIG. 6), then prior to depositing the dielectric layer in this step, a mask may be used to prevent deposition in localized areas. Then a second layer of interconnect (low resistivity chromium-alloyed diamond-like Me—C 0.5 to 1.0 micrometer thick) may be deposited onto the exposed sensor areas, patterned with another laser cutting step, and protected with a top layer dielectric layer.

21. Operation 7 repeated.

22. The conducting lines (deposited in step 13) are connected with an electronic sensing system using standard technique known from the prior art.

All the functional layers, including insulating layer, stress sensing layer, conducting (contact) layer, and top insulating and protecting layer are formed based on the same stabilized diamond-like matrix forming the entire structure of smart skin In addition, this smart skin provides aircraft wing or other object with combined anti-abrasion/anti-corrosion protection and improved aerodynamic properties of the surface.

EXAMPLE 2

1. The electrically conducting subject to be coated with smart skin, such as the aircraft wing (as shown on FIGS. 4 and 5), is cleaned with a standard technique of vacuum industry.

2. The subject to be coated with smart skin is located in vacuum deposition chamber.

3. Air is pumped out of the deposition chamber up to about 1 $0.0 \times 10^{-5}$ Torr. 4. 4. The chamber is filled with argon up to pressure of about $5 \times 10^{-5}$ Torr, and the surface to be coated cleaned in the argon low pressure discharge for about 10 minutes.

5. Unalloyed stabilized diamond-like carbon 3 micrometer thick dielectric layer deposited upon the surface of the structure (FIGS. 4 and 5), such as the aircraft wing using a known from prior techniques. The unalloyed stabilized diamond-like carbon dielectric layer possesses resistivity in an order of $10^{12}$ to $10^{13}$ Ohm-cm.

Figure 7A:
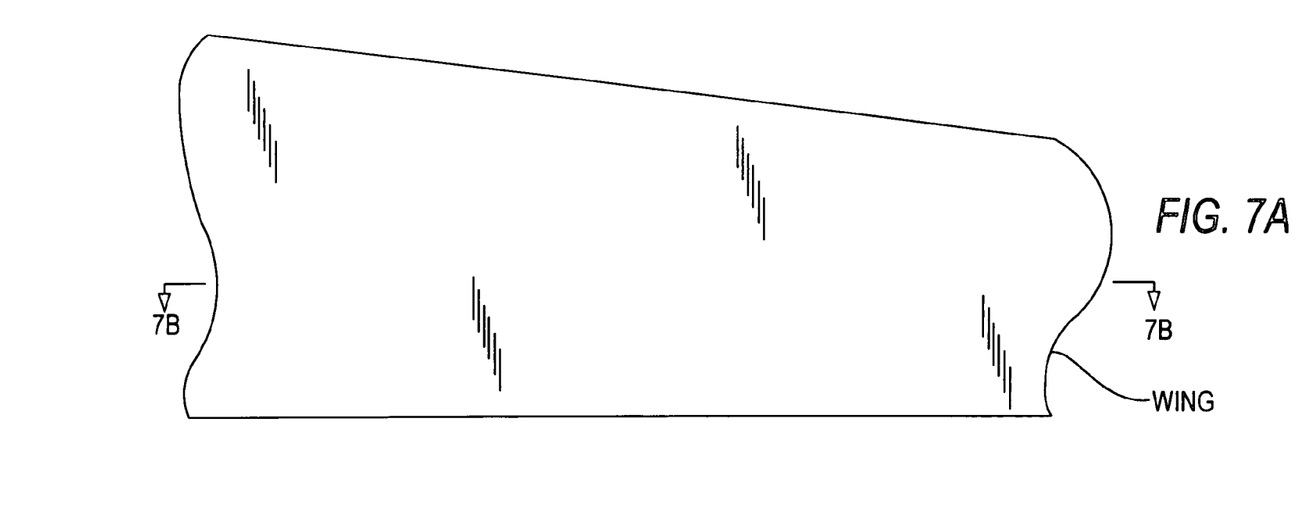
FIG. 7A shows the top view of an aircraft wing following the coating process of step 6 in Example 2.
Figure 7B:
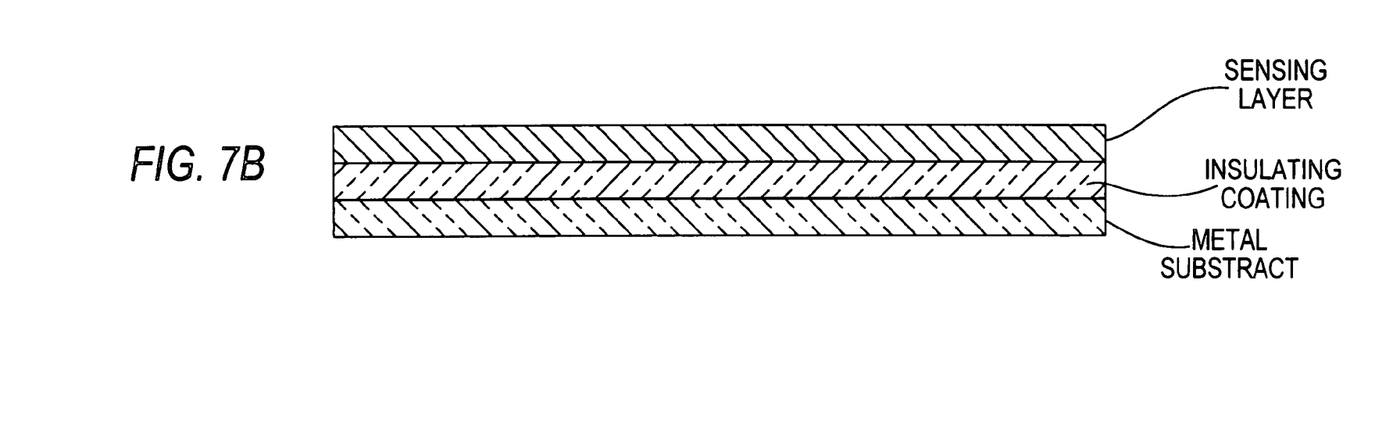
FIG. 7B shows a cross section through the coating sandwich and wing of FIG. 7A.

6. Chromium-alloyed diamond-like Me—C 0.5 to 1.0 micrometer thick conducting stress sensing layer (as shown in cross-section on FIG. 5) deposited upon the entire surface of the unalloyed stabilized diamond-like carbon dielectric layer; the chromium-alloyed diamond-like Me—C conducting layer possesses resistivity of about $10^4$ ohm-cm. Deposition of the unalloyed stabilized diamond-like carbon dielectric layer and the chromium-alloyed diamond-like Me—C conducting layer carried out in the same vacuum chamber at the working pressure of about $10^{-5}$ Torr in one two-step continuous deposition process. FIGS. 7A and 7B show a wing section following the coating process of step 6.

7. The chamber is filled with air up to atmospheric pressure and opened, the subject removed from chamber.

8. The subject is masked mechanically, e.g., with aluminum foil. Areas where no conductor lines are permitted are masked. Areas left exposed would include, for example, zones at the opposite ends of a sensor to which an electrical connection is desired.

9. The subject is located in the vacuum deposition chamber.

10. Air is pumped out of the deposition chamber up to about $1.0 \times 10^{-5}$ Torr.

11. The chamber is filled with argon up to pressure of about $5 \times 10^{-5}$ Torr, and the surface to be coated cleaned in the argon low pressure discharge for about 3 minutes.

12. Chromium-alloyed diamond-like Me—C 1- micrometer thick conducting layer (as it is shown in cross-section on FIG. 5) is deposited upon the unalloyed stabilized diamond-like carbon dielectric layer; the chromium-alloyed diamond-like Me—C conducting layer possesses resistivity of about $10^4$ Ohm-cm. The conducting layers are placed in a local area at opposite ends of the sensing pad, so as to create a current flow across the entire area of the pad. A stress occurring in the underlying substrate surface beneath a pad would be detected by a change of impedance of the pad sensing layer.

13. The chamber is filled with air up to atmospheric pressure, opened, and the subject removed from chamber.

Figure 8A:
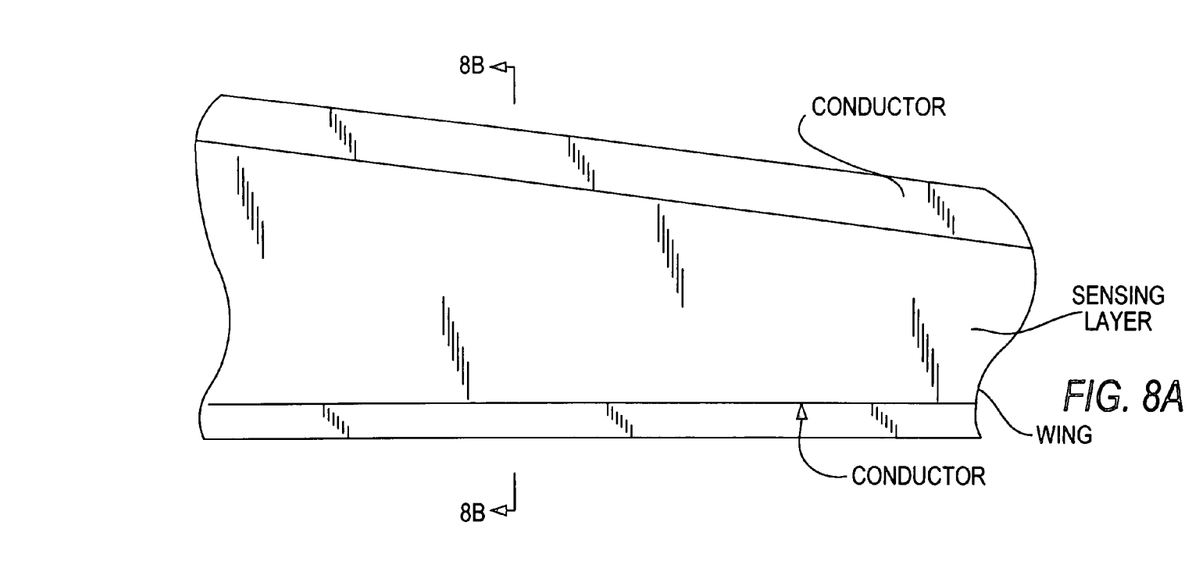
FIG. 8A shows the top view of an aircraft wing following the coating process of steps 12 to 14 in Example 2.
Figure 8B:
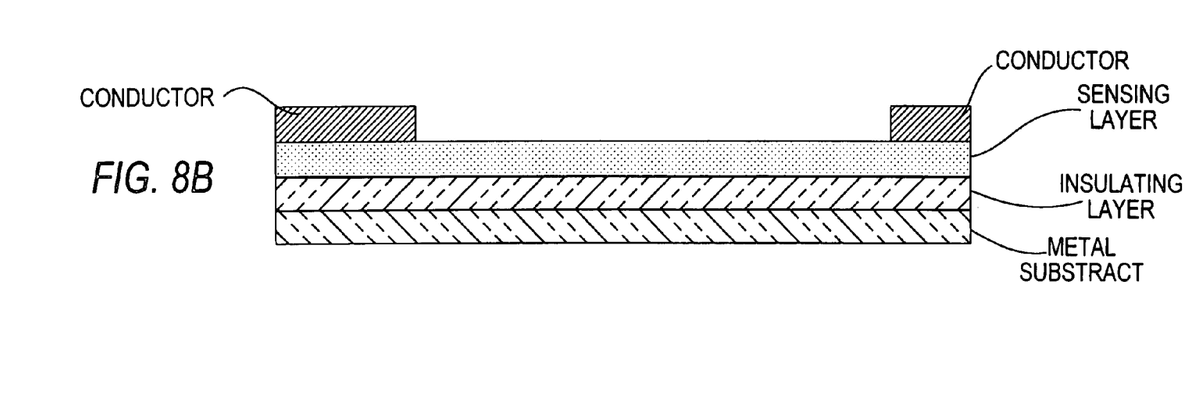
FIG. 8B shows a cross section through the coating sandwich and wing of FIG. 8A.

14. The mechanical mask removed. FIG. 8A show the top view of a wing section following the conductor deposition of step 12. FIG. 8B shows the cross section of the coating sandwich through line B—B.

Figure 9A:
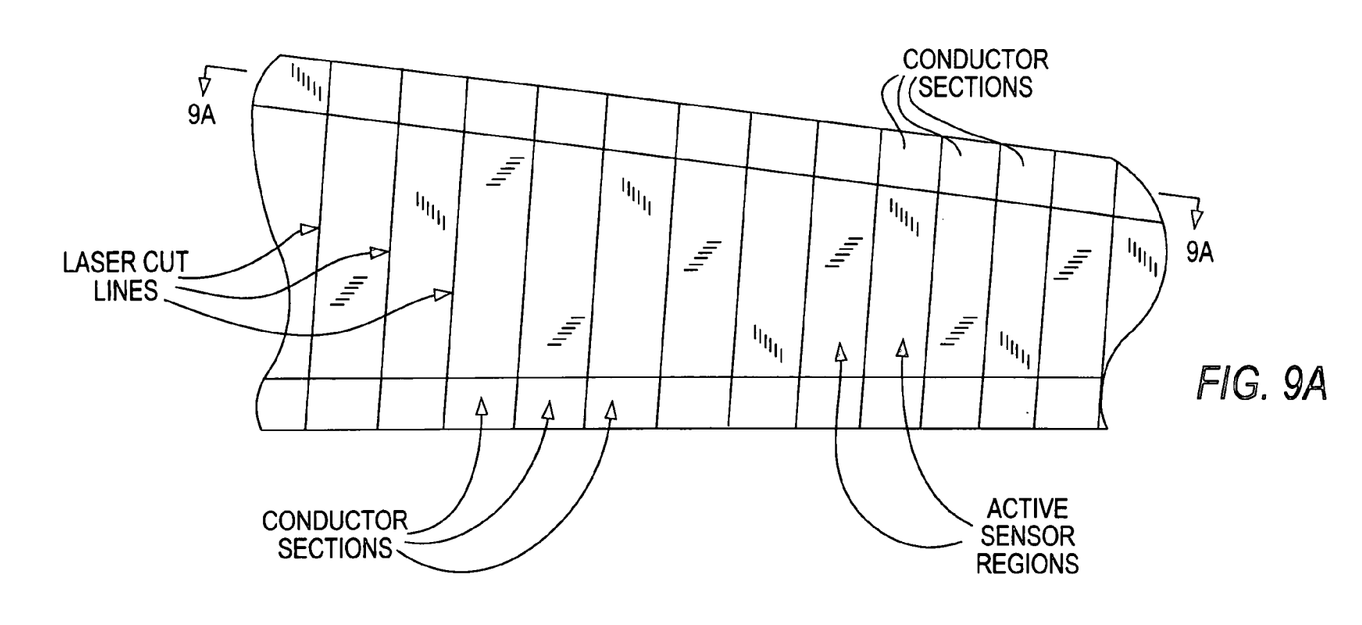
FIG. 9A shows the top view of an aircraft wing following the laser cutting process of step 15 in Example 2.
Figure 9B:
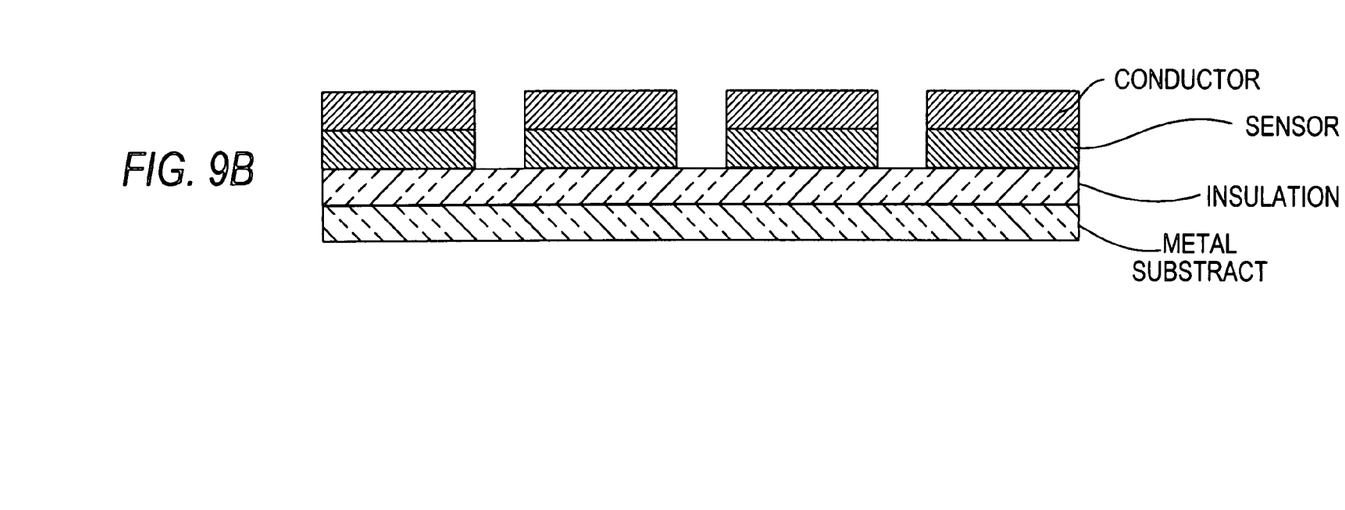
FIG. 9B shows a cross section through the coating sandwich and wing of FIG. 9A.

15. The patterning of stress-sensitive lines of near percolation highly-resistive conductors and non-sensitive low-resistive contacts and connecting lines (FIG. 4) may be realized with a laser, such as $CO_2$ laser, with a known technique. The laser cuts through the conductor layer and the top sensing layer deposited in steps 6 and 12 without penetrating the insulating layer. An example of one pattern is shown in FIG. 9A. The laser cut lines delineate and separate adjacent sensor pad areas, as well as the matching conductor pad areas at either end of each sensor.

16. The subject is located in the vacuum deposition chamber.

17. Air is pumped out of the deposition chamber up to about $1.0 \times 10^{-5}$ Torr.

18. The chamber is filled with argon up to pressure of about $5 \times 10^{-5}$ Torr, and the surface to be coated cleaned in the argon low pressure discharge for about 3 minutes.

19. The operations 2, 3, 4, and 5 repeated, and a top dielectric layer deposited as a final protective layer of smart skin. The top dielectric layer is unalloyed stabilized diamond-like carbon 2 micrometer thick possesses resistivity in an order of $10^{12}$ to $10^{13}$ Ohm-cm. If more than two sensing lines are required for each sensor (as is shown in FIG. 6), then prior to depositing the dielectric layer in this step, a mask may be used to prevent deposition in localized areas. Then a second layer of interconnect (low resistivity chromium-alloyed diamond-like Me—C 0.5 to 1.0 micrometer thick) may be deposited onto the exposed sensor areas, patterned with another laser cutting step, and protected with a top layer dielectric layer.

20. Operation 7 repeated.

21. The conducting lines connected with electronic control systems using standard technique known from the prior art.

All the functional layers, including insulating layer, sensitive near-percolation conducting layer, regular conducting layer, and top insulating and protecting layer are formed based on the same stabilized diamond-like matrix forming the entire structure of smart skin. In addition, this smart skin provides aircraft wing or other object with combined anti-abrasion/anti-corrosion protection and improved aerodynamic properties of the surface.

Example 2 is different from Example 1 in that that the patterning of the stress-sensitive lines of near percolation high-resistive conductors and non-sensitive low resistive electrodes realized with the laser in the one-step operation.

FIG. 6 shows a schematic of Me—ASC percolation sensor with capacitor bridges allowing diagnostic of the exact location of dangerous stress. Legend to FIG. 6: 1—percolation transition sensor; 2—external resistor; 3—capacitors or contacts; 4—stressed area (tensile stress) with increased resistivity. A voltage can be applied from U1 to U2 and measured with capacitors or contacts at 3. Capacitors can be used if the applied voltage is an AC voltage. A high impedance DC voltmeter can be used if the potential applied at UI is a DC potential and item 3 are contacts. The pre-defined voltage is applied to both ends of each the conductor, and the resistance of each conductor monitored continuously or in accordance with appropriate timing.

In addition to or instead of control of the Me—C ASC conductors, with the purpose of precise diagnostic of the dangerous stress location, the voltage distribution along each conductor or certain selected conductors may be measured using standard techniques of the prior art, such as bridging capacitor circuits. In this sensor monitoring the current allows detecting the occurrence and an approximate location of dangerous stress, and the distributed capacitance or contact sensors allow determination of the exact location of dangerous stress area.

The present invention, therefore, is well adopted to carry out the objects and attain the ends and advantages mentioned. While preferred embodiments of the present invention have been described for the purpose of disclosure, numerous other changes in the details of the material structure, composition, graded functionality and device designs can be carried out without departing from the spirit of the present invention which is intended to be limited only by the scope of the appended claims.

What is claimed is:

1. A process for measuring stress on a conducting surface having an insulating coating applied to said surface and a conductive coating applied to said insulating coating, the process comprising measuring a change in resistivity of said conductive coating, wherein said conductive coating comprises stabilized diamond-like metal-carbon atomic scale composites having a concentration of metal that exhibits conductivity percolation with an applied stress.

2. A stress sensor system comprising at least one stress sensor, wherein the sensor comprises:
   a first electrode;
   at least one other electrode; and
   a sensing film disposed in relation to the first and the at least one other electrode for determining a change in resistivity of the sensing film, wherein the sensing film comprises a diamond-like metal-carbon atomic scale material having a concentration of metal for the material to exhibit conductivity percolation with an applied stress.

3. The stress sensor system of claim 2, wherein the diamond-like metal-carbon material is a stabilized diamond-like metal-carbon composite.

4. The stress sensor system of claim 3, wherein the diamond-like metal-carbon material is stabilized with silica.

5. The stress sensor system of claim 2, wherein the diamond-like metal-carbon material comprises a metal selected from the group consisting of Cr, Ni, Fe, Co, Mo, W, Nb, Ta, Ti, V, Mn, Re, and Hf.

6. The stress sensor system of claim 2, wherein the concentration of the metal of the diamond-like metal-carbon is up to about 50%.

7. The stress sensor system of claim 2, wherein the concentration of the metal of the diamond-like metal-carbon is about 25%.

8. The stress sensor system of claim 2, wherein the diamond-like metal-carbon is free of phases greater than about 30 nanometers.

9. The stress sensor system of claim 2, wherein the diamond-like metal-carbon material comprises a pre-percolation metal composition for sensing compressive stress.

10. The stress sensor system of claim 2, wherein the diamond-like metal-carbon material comprises a post-percolation metal composition for sensing tensile stress.

11. The stress sensor system of claim 2, wherein the diamond-like metal-carbon material comprises a middle-percolation metal composition for sensing at least one of compressive and tensile stress.

12. The stress sensor system of claim 2, wherein the sensing film is adhered to a substrate to be monitored for stress.

13. The stress sensor system of claim 12, wherein the substrate is electrically conductive and wherein a dielectric film is adhered to the substrate and the sensing film is adhered to the dielectric film.

14. The stress sensor system of claim 12, wherein the sensing film is adhered to the substrate by depositing the sensing film on the substrate using a deposition process.

15. The stress sensor system of claim 14, comprising a plurality of stress sensors, wherein the sensing film of each of the plurality of stress sensors is cut from a sensing layer deposited onto the substrate.

16. The stress sensor system of claim 14, wherein the first and the at least one other electrode are formed by depositing a conducting layer over the sensing film using a mask with contact areas over the sensing film exposed.

17. The stress sensor system of claim 14, wherein the stress sensor comprises a dielectric stabilized diamond-like carbon layer deposited over the stress sensor.

18. A stress sensor system comprising at least one stress sensor, wherein the sensor comprises:
a first electrode;
at least one other electrode; and
a sensing film disposed in relation to the first and the at least one other electrode for determining a change in resistivity of the sensing film, wherein the sensing film comprises a silica stabilized diamond-like metal-carbon atomic scale material having a concentration of metal for the material to exhibit conductivity percolation with an applied stress, and wherein the sensing film is deposited onto to a substrate to be monitored for stress.

19. A stress sensor system comprising at least one stress sensor, wherein the sensor comprises:
a first electrode;
at least one other electrode; and
a sensing film disposed in relation to the first and the at least one other electrode for determining a change in resistivity of the sensing film, wherein the sensing film comprises a diamond-like metal-carbon atomic scale material having one of:
a pre-percolation metal composition for sensing compressive stress;
a post-percolation metal composition for sensing tensile stress; and
a middle-percolation metal composition for sensing at least one of compressive and tensile stress.

20. The stress sensor system of claim 19, comprising a plurality of stress sensors, wherein the sensing film of each of the plurality of stress sensors is cut from a sensing layer deposited onto a substrate to be monitored for stress.

21. The stress sensor system of claim 20, wherein a substrate is electrically conductive and a dielectric layer is deposited over the substrate and the sensing layer is deposited over dielectric layer.

* * * * *